Figure 4:
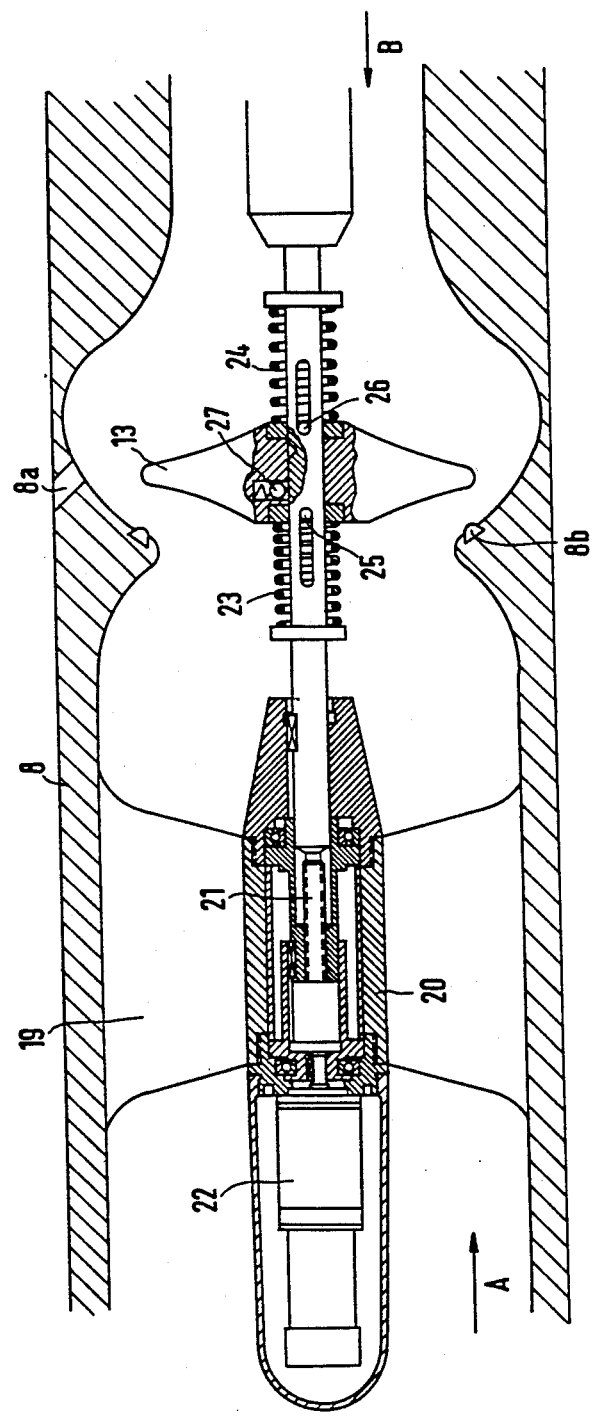

United States Patent [19]

Johansen et al.

[11] Patent Number: 4,852,614

[45] Date of Patent: Aug. 1, 1989

[54] SHUT-OFF DEVICE WHICH CAN BE INSERTED INTO A PIPELINE

[75] Inventors: Trond V. Johansen, Trondheim; Ola Ruch, Flatsåen; Ludvig Naess, Tiller, all of Norway; Robert Weber, Uttenreuth, Fed. Rep. of Germany; Bernd Veenhoff, Langensendelbach, Fed. Rep. of Germany; Horst Pörner, Röttenbach, Fed. Rep. of Germany; Erwin Laurer, Möhrendorf, Fed. Rep. of Germany; Erich Strickroth, Buckenhof, Fed. Rep. of Germany; Hans-Peter Schabert, Erlangen, Fed. Rep. of Germany

[73] Assignee: Den Norske stats oljeselskap a.s., Norway

[21] Appl. No.: 31,404

[22] Filed: Mar. 27, 1987

[51] Int. Cl.$^4$ .............................................. F16L 55/12
[52] U.S. Cl. .................................................... 138/93
[58] Field of Search ..................... 138/89, 90, 93, 97; 137/459, 460, 470, 517

[56] References Cited

U.S. PATENT DOCUMENTS

| | | | |
|---|---|---|---|
| 2,439,117 | 4/1948 | Waterman | 137/460 X |
| 2,786,489 | 3/1957 | Morrill, Jr. | |
| 2,926,690 | 3/1960 | Martin | 137/460 |
| 3,107,696 | 10/1963 | Ver Nooy | 138/89 |
| 3,381,714 | 5/1966 | Johnson | 138/97 |
| 3,495,626 | 2/1970 | Nagel | |
| 3,543,852 | 12/1970 | Taylor | |
| 3,683,957 | 8/1972 | Sands | 137/460 |
| 3,895,652 | 7/1975 | Zach | 138/89 |
| 3,978,678 | 9/1976 | Duncan et al. | 138/89 X |
| 4,026,329 | 5/1977 | Thompson | 138/89 X |
| 4,077,435 | 3/1978 | Van Scoy | 138/89 X |
| 4,332,277 | 6/1982 | Adkins, et al. | 138/89 |
| 4,413,653 | 11/1983 | Carter, Jr. | |
| 4,422,477 | 12/1983 | Wittman et al. | |
| 4,423,754 | 1/1984 | Carter, Jr. | 138/93 |
| 4,442,867 | 4/1984 | DeSivry et al. | 138/93 |
| 4,458,721 | 7/1984 | Yie et al. | 138/93 |
| 4,605,039 | 8/1986 | Johnson et al. | 137/460 |

FOREIGN PATENT DOCUMENTS 1452232 10/1976 United Kingdom .
1554894 10/1979 United Kingdom .

Primary Examiner—Stephen Marcus
Attorney, Agent, or Firm—Lucas & Just

[57] ABSTRACT

The shut-off device is a hollow cylinder upon which is disposed a brake for fixing the position of the device in the pipeline and a seal which seals the area between the hollow cylinder and the wall of the pipeline. A valve is positioned in the hollow cylinder which allows flow of the pipeline fluid through the hollow cylinder when open but can be closed to stop the flow of pipeline fluid through the cylinder. The device is movable through the pipeline.

22 Claims, 5 Drawing Sheets

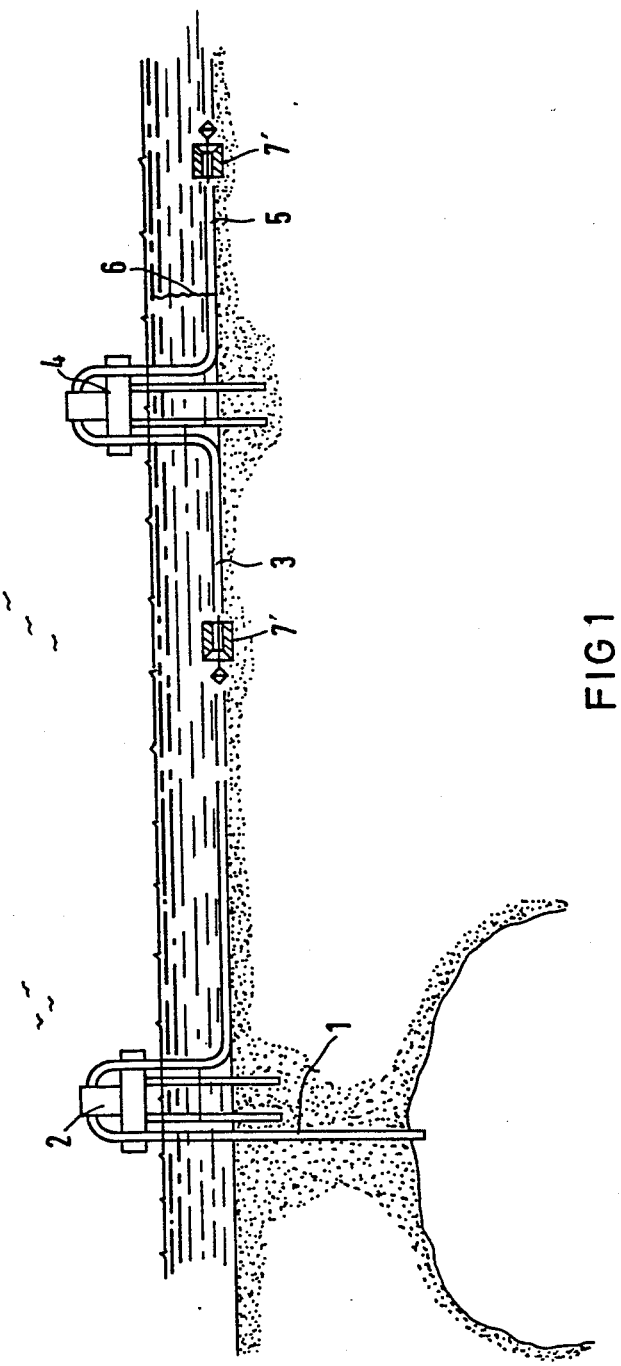

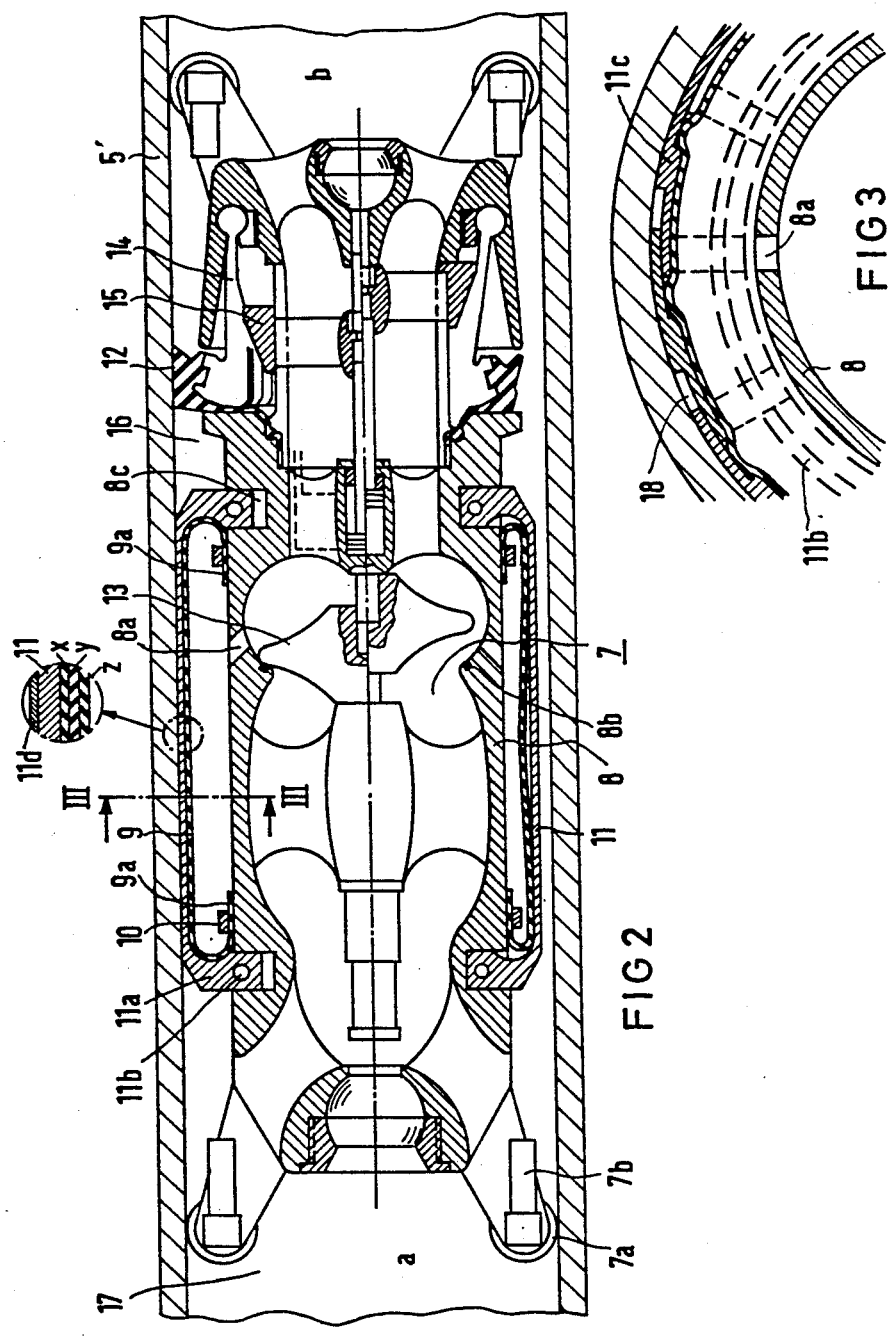

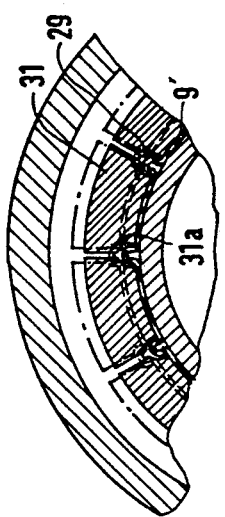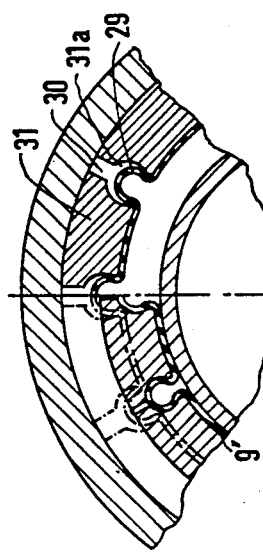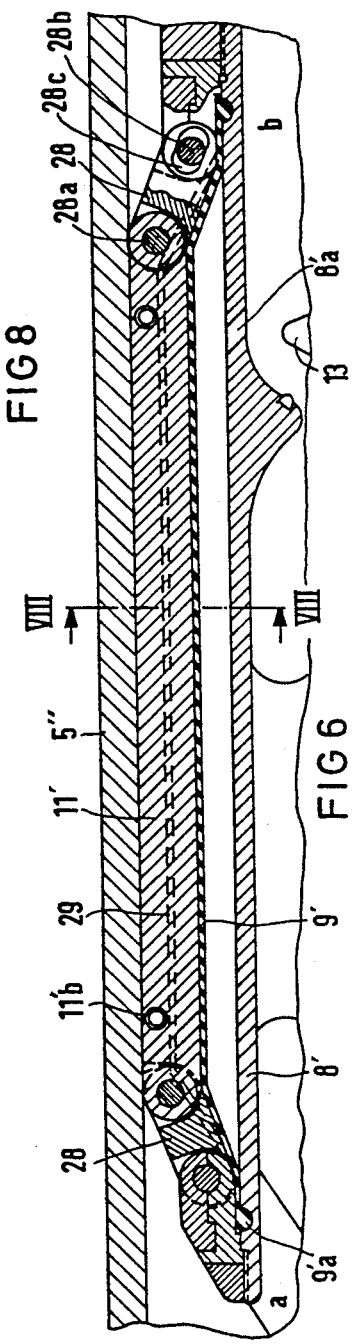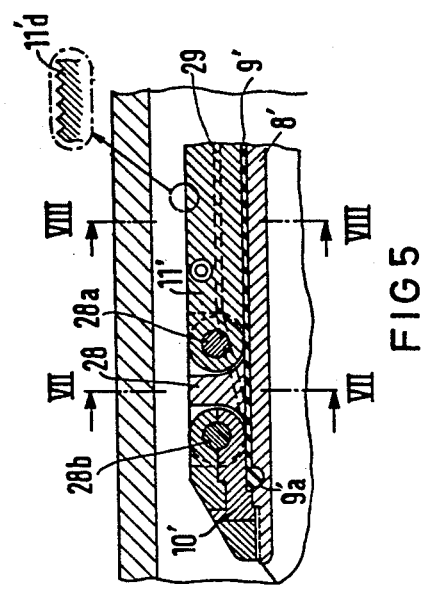

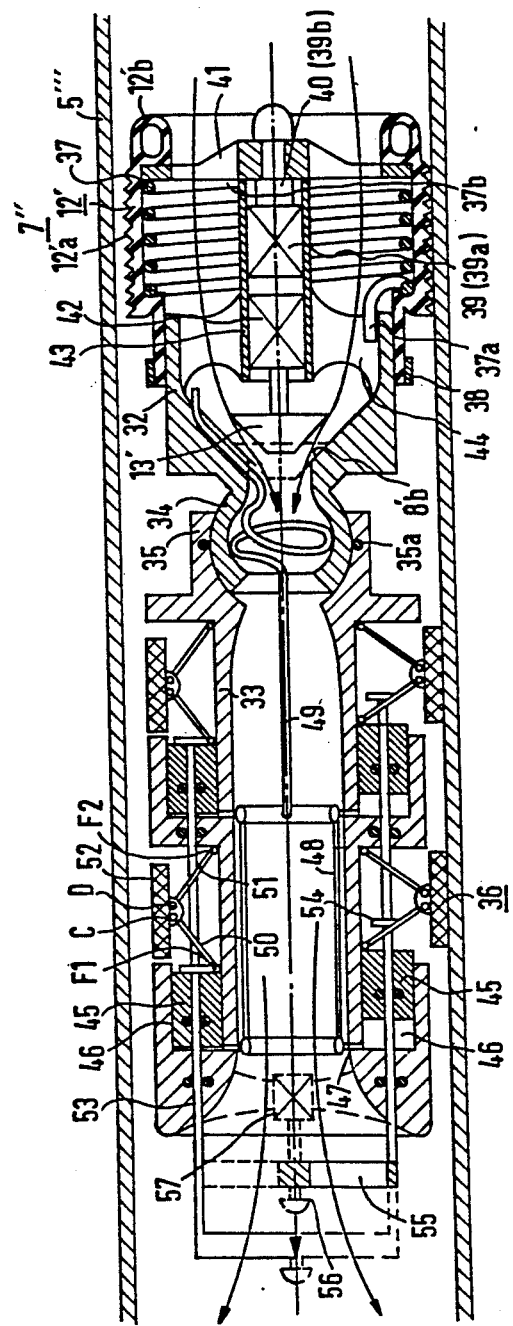

SHUT-OFF DEVICE WHICH CAN BE INSERTED INTO A PIPELINE

The invention relates to a shut-off device which can be inserted into a pipeline.

European Patent No. 0 087 867 discloses a pipe shut-off device which can be introduced into a pipeline after a leak occurs or for test purposes. This pipe shut-off device consists of two bodies which can be coupled together, one of them being constructed in the manner of an elastic stopper which has sealing lips on its circumference, whose diameter corresponds to the inside diameter of the pipe. The second body serves for anchoring and is constructed in the manner of a pot formed by a metal bottom and a radially expandable mantle of rubber-elastic material joined to it. The mantle consists, in an area adjacent the metal bottom, of a plurality of elastic plastic layers with metal-reinforced inserts which form the actual anchoring part. On the metal bottom there is disposed a check valve which can be brought into the open or closed position under remote control from an electronic apparatus. After the pipe shut-off device is inserted into the pipeline it is pumped with the valve open to a given point. The open valve produces a pressure equalization, so that the pipeline medium flows around the mantle and the latter can not lay itself against the wall of the pipe during transport. To anchor the pipe shut-off device the valve is closed under remote control by an electromagnetic signal and the pipeline medium is placed under pressure, forcing the mantle of the anchoring part against the pipe will and holding it in place by friction. To release the shut-off device from the wall, the valve is reopened, the elastic mantle contracts again by the pressure equalization and is lifted away from the inner surface of the pipeline.

A similar system is disclosed in DE C No. 31 42 768. This shut-off device consists of a cylindrical body which is surrounded by an inflatable rubber sleeve and bears an annular seal at each end. In case of trouble the shut-off device is introduced into the pipeline at a platform and floated through the pipeline in the manner of a piston. In the vicinity of the leak the shut-off device is locked in the pipeline. For this purpose compressed-gas bottles which are disposed within the cylindrical body are opened by remote ignition, so that gas is introduced into the rubber balloon which forces an outer sleeve against the pipe wall and in this manner the shut-off device is locked in the pipeline. Thus no more of the medium reaches the leak.

Not until trouble occurs, i.e., when a leak occurs in a pipeline, can these known shut-off devices be floated in the manner of a piston through the pipeline and brought to a given point. The employment of such shut-off devices requires a great amount of time before they can be brought to the vicinity of the leak when one occurs.

The invention is addressed to the problem of devising a device for sealing off a pipeline, which can be inserted into the pipeline without interrupting the flow of the medium, and can be actuated immediately upon the occurrence of a leak in the pipeline, without first having to be introduced into the pipeline upon the occurrence of a leak and brought to the location of the leak.

This problem is solved according to the invention by a shut-off device which can be inserted into a pipeline and which consists of a hollow cylinder with a braking means for locking the shut-off device at a given point in the pipeline, a valve which is disposed on the hollow cylinder and is designed to allow all of the pipeline medium to flow through it, and a remotely controlled, radially actuated shut-off device which in the extended state seals the valve against the pipeline.

In this manner, in contrast to the known shut-off device with a pot-like locking means, the use of a separate stopper for the introduction of the shut-off means into the pipeline is unnecessary. The shut-off device according to the invention, in contrast to the known shut-off devices, can be introduced into the pipeline during operation before the occurrence of a leak and anchored at a given point that is appropriate from the point of view of safety.

According to an advantageous embodiment of the invention, a shut-off device is provided which can be inserted into a pipeline and consists of a hollow cylinder with a braking means, a valve cone disposed in the hollow cylinder, and a radially actuated sealing means disposed between the pipe wall and the hollow cylinder, wherein the pressure difference of the fluid, which develops when the valve cone is open, serves for the production of forces for locking the braking means, and the elevated pressure difference produced by the closing of the valve cone is utilized to produce the required higher braking force. This embodiment has the advantage over the known shut-off device that means for storing pressure for the operation of the braking envelope can be dispensed with, and the braking forces against the pipe wall do not become appreciable until the valve cone is closed.

Advantageously, the shut-off device has a hollow cylinder of stable shape which has seats to accommodate the indrawn ends of an annular rubber bag, and clamps for fastening the rubber bag. This bag is surrounded by a longitudinally slotted brake sleeve of metal which on the end facing away from the pressure is bonded to the hollow cylinder through which the pipeline medium flows and on the end facing the pressure it bears the radially actuated sealing means which closes off the annular space between the pipeline and the hollow cylinder. In its open state the valve cone allows the pipeline medium to flow through it and in the closed state it shuts it off. Thus, when the valve cone is closed the braking forces acting on the pipe wall are not added to the forces from the full gas pressure, since they are applied to the low-pressure side, so that the pipe wall is not overstressed.

For the shutting off of very high pressure pipelines it is desirable to provide two hollow cylinders and to dispose at least at one end of the first hollow cylinder a coupling which can be engaged with a coupling provided on the second hollow cylinder and sealed, the valve and the radially actuated sealing means being disposed on the first hollow cylinder and the braking device being disposed on the second hollow cylinder. This makes it possible for the device to pass through pipe bends even with the large brake areas necessary for the production of high braking forces.

The invention will be further explained hereinafter with the aid of schematic drawings, wherein:

FIG. 1 shows a pipeline diagram with a drilling platform and an intermediate platform, FIG. 2 a shut-off device, FIG. 3 a fragmentary cross section of the brake envelope of the shut-off device shown in FIG. 2, FIG. 4 the construction of a valve cone, FIG. 5 a fragmentary cross section of a modified locking system of the shut-off device in the retracted position, FIG. 6 a fragmentary cross section in the extended state, FIGS. 7 and 8 are cross sections corresponding to FIGS. 5 and 6, and FIG. 9 shows a shut-off device in which a valve and a radially actuated sealing system are disposed on a first hollow cylinder and a braking device on a second hollow cylinder, the two hollow cylinders being coupled to one another.

In FIG. 1, represents a pipeline through which natural gas is flowing to a platform 2 and is carried through a pipeline 3 to another platform 4. From there another pipeline 5 leads to a platform at a great distance away, which is not shown in the drawing. If a leak 6 develops in the pipline 5 in the near vicinity of the platform 4, then, even after the pipeline 5 on the platform 4 has been shut off, gas will continue to be fed to the leak from the pipeline 5 between the platform 4 and the farther platform, which is still under pressure and is oftenmore than 100 km long, since a flow toward the platform 4 develops in that pipeline 5 between the leak and the farther platform. Combustible gas escapes, which can endanger the platform 4. To limit the escape of gas, shut-off devices 7' are used in the pipelines.

FIG. 2 represents a shut-off device of this kind. The upper half of the cross section shows the extended state and the lower half the retracted state of the brake envelope 11 and the sealing device 12. For the installation and removal of the shut-off device 7, it has a running gear having wheels 7a and motors 7b. An inspection hole at an accessible point on the pipeline in the vicinity of the drilling platform or intermediate platform permits the introduction and removal of the shut-off device. When the shut-off device has been introduced into the pipeline, the driving wheels 7a are forced against the pipe wall so strongly that the device can climb slopes. The shut-off device is stationed at the end of a short section in front of the drilling platform and in front of platform 4 (FIG. 1).

The shut-off device consists, as shown in FIG. 2, of a hollow cylinder 8 which has seats to receive the indrawn ends 9a of an annular rubber bag 9, and clamps 10 in the form of rings for fastening the rubber bag 9. The rubber bag 9 is surrounded by a longitudinally slotted brake envelope 11 of metal with a slotted internal flange 11a situated at each end. The cylinder end facing the pressure bears a radially actuated sealing means 12 which closes the annular gap between the pipeline 5' and the hollow cylinder 8. A valve seat 8b is provided on the hollow cylinder 8 and is associated with a valve cone 13 which is the open state (lower half of cross section) allows the pipeline medium to pass through and shuts it off in the closed state (upper half of cross section).

After the shut-off device 7 has been brought into the pipeline 5' it is locked in place by forcing the brake envelope 11 against the pipe wall. For this purpose the hollow cylinder 8 has openings 8a. After the sealing means 12 has been pressed against the pipe, and while the pipeline medium is flowing through the hollow cylinder 8, these openings 8a admit the pipeline medium from the pressure side into the space between rubber bag 9 and hollow cylinder 8. Due to the pressure difference that develops, the rubber bag 9 and with it the brake envelope 11, is pressed against the inner wall of the pipeline 5', producing a holding force which is greater than the axial thrust acting on the shut-off device 7.

With the shut-off device locked in place, the pipeline medium can continue to flow through the pipeline 5 in normal operation. In the shut-off device 7 means are provided for the remotely controlled closing and opening of the valve cone 13 and for the automatic closing of the valve cone 13. If a leak 6 occurs in the vicinity of platform 4, it is detected by monitor means on the platform and the valve cone 13 can be closed under remote control.

An overriding automatic closing system integrated into the valve cone 13 also permits automatic closing in the event of trouble in the remote control system. This is achieved by the fact that the valve cone 13 reacts to an elevated flow produced by the leakage, as will be further described below in conjunction with FIG. 4.

The slotted internal flanges 11a situated at the ends of the slotted brake envelope 11 is engaged in annular grooves 8c in the hollow cylinder 8 to hold the envelope in place axially. The slotted brake envelope 11 consists preferably of brake slats resistant to bending and turned in at both ends. The turned-in portion of the brake slat, including the transition to the slat itself, is made resistant to flexure at least at the end a facing away from the pressure. Restoring forces are thereby largely avoided.

To prevent the rubber bag 9 from touching the wall of the pipeline, the brake slats 11c are made to overlap tangentially (FIG. 3).

The brake slats are associated with retracting elements 11b in the form of annular springs. These annular springs prevent the brake envelope 11 from being extended during the installation and removal of the shut-off device 7.

The rubber bag 9 is advantageously of laminated construction, the individual layers x, y and z having different hardnesses. In this manner greater resistance to wear and greater safety from possible mechanical damage are achieved.

It is desirable to arrange and construct the radially actuated sealing means 12 such that, upon the occurrence of a given pressure difference between the point of entry of the fluid into the shut-off device and the point of exit of the fluid from the valve cone 13, the sealing means 12 will additionally be urged by mechanical means against the wall of the pipeline. On the end b of the hollow cylinder 8, resilient levers 14 are provided as mechanical means on the outside of the hollow cylinder 8, where they are pivotingly mounted. At their free ends the levers 14 have claws to hold the annular sealing means 12, which is in the form of a skirted ring. The resilient levers 14 press the sealing means 12 evenly against the pipeline 5'. The space inside of the annular sealing means 12 is accessible from the high-pressure end, so that the pressure difference produces an additional pressing force. To bring about the retraction of the sealing means 12 when the shut-off device 7 is being installed and removed, a truncated conical ring 15 is disposed for axial displacement on the hollow cylinder, which in the one position extends the lever 14 and the sealing means 12 against the bias of the levers and sealing means 12. In the other position of the ring 15, the levers 14 are released, so that the levers 14 and the sealing means 12 spring back.

In other words, in order to press sealing means 12 against the inner wall of pipeline 5, truncated cone 15 moves from a first position, shown in the lower half of FIG. 2, to a second position, shown in the top half of FIG. 2. Truncated cone 15 is moved from the first position to the second position because truncated cone 15 is affixed to spindle 21 which connects from motor 22 through cone 13. When valve cone 13 moves to engage valve seat 8b, thereby closing the valve, truncated cone 15 moves from a first position to a second position, thereby forcing sealing means 12 against the inner wall of pipeline 5.

To achieve good elasticity and mechanical strength in the rubber bag 9, its thickness is less than 1 cm. A thickness of 5 mm is preferred.

To achieve a shut-off device of short length, it is desirable to provide the brake envelope 11 with a covering 11d having a high coefficient of friction.

In order to assure a great pressure difference, the chamber 16 is connected to chamber 17 by longitudinal grooves, tubes or gaps 18 (FIG. 3).

The manner of the operation of the valve cone 13 will be explained with the aid of FIG. 4. In the hollow cylinder 8 a hub 20 is mounted on struts 19 and in it is mounted the motor 22 and an actuating spindle 21 for the valve cone 13. On a prolongation of the valve spindle 21 there are provided two compressively biased springs 23 and 24 with abutments 25 and 26 between which the valve cone 13 is mounted for longitudinal displacement in two directions. Normally, the valve cone 13 can be brought to the open or closed position by means of the motor 22, without any change in the bias of the springs 23 and 24.

Assuming that the gas flows in the direction of the arrow A, if trouble occurs in the near vicinity of the platform, the direction of flow reverses itself (direction of arrow B) and the valve cone 13 automatically closes against the force of spring 23 on account of the increased velocity of flow of the fluid medium. In this manner the gas flow from the long pipe toward the platform 4 is immediately interrupted.

If the valve cone 13 should be actuated by motor for test purposes and if it should remain in this closed position in spite of the actuation of the motor, the valve cone will open against the force of spring 24 in the direction of the arrow A at a given pressure of the fluid medium. A catch means 27 in the form of a detent will then hold the valve cone 13 in the open position.

A section of a modified means for locking the shut-off device 7 is represented in the retracted position in FIG. 5. The slotted brake envelope 11' is connected to the hollow cylinder 8' by links 28 journaled at joints 28a, 28b. These links are in the form of rockets which, when the brake strips 31 (FIGS. 7 and 8) are applied to the pipe 5' form a low angle with the pipe axis on the side facing away from the pressure. At the two ends the annular rubber bag 9' is fastened by an annular clamp 10'. In this case the rubber bag 9' has radially disposed toroidal bends 29 running in the axial direction, which terminate at a low angle or diminish to zero at the ends of the annular rubber bag.

The slotted metal brake envelope 11' has in the slots 30 the recesses 31a into which the beads 29 project and find sufficient space when the brake envelope is in the retracted state. In the extended state, the rubber bag 9' and the brake envelope 11' assume the position indicated in FIG. 6. This embodiment has the advantage that the rubber bag has about the same developed length circumferentially both for the extended and for the retracted position. The circumferential enlargement resulting from the extending movement is accomplished by the change in the shape of the beads 29. This makes it possible to reinforce the rubber bag 9' tangentially, for example with fabric or mesh inserts, so that a high safety of operation results. In this manner overlaps to cover the gaps are unnecessary and the freedom of movement of the brake envelope can be significantly improved.

Another shut-off device 7 is represented in cross section in FIG. 9. The upper half of the cross section shows the transport position and the bottom half the shut-off position. The shut-off device which can be introduced into the pipeline 5' has a hollow cylinder 32 on which a valve 13' is disposed which in the open state is of a size to allow the entire fluid medium to pass. On the hollow cylinder 32 there is furthermore disposed a radially actuated sealing means 12' whose outside diameter is smaller in the retracted position than the inside diameter of the pipe. In the extended state of the sealing means 12' the shut-off device is sealed against the pipeline. The sealing means 12' is in the form of an annular seal and can be extended by a cylindrical spring 37. The sealing means 12' has a sleeve which surrounds the cylindrical spring and is fastened to the hollow cylinder 32 by a band clamp 38. Sealing lips 12'a are provided on the outside of the sleeve. The ends 37a and 37b of the cylindrical spring 37 are brought inwardly to a fixed point and to a drive 39 in the form of an electric motor or hydraulic motor. The one end 37a of the cylindrical spring 37 is attached to the hollow cylinder 32 and the other end 37b is attached by a perforated disk 41 and a longitudinally displaceable coupling 40 (clutch) to the shaft 39b of the drive 39.

When the cylindrical spring 37 is in the relaxed state its outside diameter is greater than the inside diameter of the pipe 5'. If the drive 39 is energized, the ends 37a and 37b of the cylindrical spring 37 are turned opposite one another such that the diameter of the cylindrical spring 37 and the sealing means 12' is reduced to a smaller diameter than the pipe diameter. To apply the annular seal 12' to the inside of the pipe, the direction of rotation of the drive 39 is reversed, whereupon the cylindrical spring 37 is relaxed.

The sealing means 12', whose sleeve is made of flexible material, preferably of rubber or plastic, is centrally guided at its free end by the perforated disk 41. The guiding surface on the barrel is formed by an annular bolster 12'b which is disposed on the free end of the sleeve.

On the hollow cylinder 32 there is also disposed a valve 13' which can be actuated by an electrical or hydraulic drive 42. This drive is housed together with the drive 39 in a tubular casing 43 which in turn is fastened by struts to the hollow cylinder 32. The housing 39a is rigidly joined to the casing 43.

One end of the hollow cylinder 32 is tapered inwardly and formed into a valve seat 8b'. This end of the hollow cylinder 32 also bears a coupling 34 which is brought into engagement with a coupling 35 provided on a second hollow cylinder 33 and can be sealed. The coupling is a tubular ball-and-socket coupling in which one or more gaskets 35a are disposed.

The second hollow cylinder 33 has the braking means 36 which serves to stop and hold the shut-off device at a given point in the pipeline. Pistons 45 in cylinders 46 are disposed lengthwise of the hollow cylinder 33. To these cylinders 46 run hydraulic fluid lines 47, 48 and 49 which begin in the area ahead of the seat of valve 13'.

The section of line inside of the couplings 34 and 35 is bent in a spiral.

Each piston 45 acts on a four-joint linkage consisting of two parallel pairs of levers 50 and 51. One base point F1 of the four-joint linkage is journaled on the piston 45 while the other base point F2 is articulated on the hollow cylinder 33. The other ends of the levers are journaled each in a joint C and D, respectively, of a brake shoe 52. When the valve is opened the brake shoes are in the retracted position (upper half of the cross section). The difference in pressure ahead of and behind the valve is utilized for the operation of the pistons 45. Thus, when the valve 13' is closed, the full pressure of the pipeline medium acts in the cylinders 46. The brake shoe then, in the engaged state, hold the shut-off device tightly in the pipeline.

All of the longitudinal piston 45 connected in series are joined to a return rod 53 carried through the pistons such that they are able to move freely in the brake-applying direction and enable the brake shoes 52 to perform movements of different length (see bottom half of the cross section).

The return movement of all pistons 45 and hence of the brake shoes 52 is performed positively by abutments 54 on the return rod 53 which is passed sealingly through the pistons 45. Since several series of pistons are disposed circumferentially within the hollow cylinder 33, all of the ends of the return rods 53 are combined such that only one central operation needs to be performed. It is desirable to provide a spider 55 combining all rod ends with a coupling 56 so that a transporting vehicle can be coupled to it and the brakes can be released by pulling in the direction of the arrow. It is also possible, however, to release the brakes by means of a hydraulic actuator 57 acting on the spider 55.

While the pipeline is in operation, the shut-off device is introduced or floated by the pipeline medium into the pipeline 5" with the brake shoes 52 disengaged, with the valve 13' open, and with the sealing means 12' retracted, or it can be brought by a transporting vehicle to a given point in the pipeline. It is the pressure of the fluid flowing through the pipeline itself that moves the device illustrated in FIG. 9 through the pipeline. Alternatively, as mentioned above, a conventional transportation vehicle can be used to move the device of FIG. 9 through the pipeline. By electrical remote control, the sealing means 12' is then actuated, so that the annular spring 37 presses the rubber sleeve against the inside surface of the pipe. The force of spring 37 is advantageously made such that, with the valve open, the sealing means 12' acts also as a working brake which locks the shut-off device in the desired position while the pipeline medium is flowing through. Means are provided in the shut-off device 7' for the remotely controlled closing and opening of the valve 13' and for the automatic closing of the valve 13'. If a leak occurs, it is detected by monitors and the valve 13' can be closed by a known remote control system for a central station. The pressure difference that then forms in the hollow cylinders 32 and 33 is utilized for the production of the necessary higher locking force. The pistons 45 are actuated through lines 47, 48 and 49 with the high working pressure and the brake shoes 52 are pressed against the inside surface of the pipe 5'. Thus a holding force is produced which is greater than the axial thrust acting on the shut-off device.

We claim:

1. A movable pipeline shut-off device which can be inserted into a pipeline and be positioned in the pipeline during normal operation of the pipeline while pipeline medium flows through the pipeline, said shut-off device comprising:
   (a) a hollow cylinder;
   (b) braking means for locking the shut-off device at a given point in the pipeline, said braking means attached to said hollow cylinder and disposed between the hollow cylinder and the pipeline wall;
   (c) a valve disposed in the hollow cylinder (8), said valve being of a size for normal passage of all of the pipeline medium, said valve having an open position and a closed position;
   (d) a remotely controlled, radially displaceable sealing means for sealing the space between the pipeline wall and the hollow cylinder, said sealing means attached to said hollow cylinder and disposed between the hollow cylinder and the pipeline wall;
   (e) means for remotely controlled closing and opening of the valve;
   (f) means for the automatic closing of the valve when the velocity of flow of the pipeline medium exceeds an operational velocity; and
   (g) means for pressing said sealing means against the wall of the pipeline upon a given pressure difference between side (b) on which the pipeline medium enters into the shut-off device and side (a) on which the pipeline medium exits from the shut-off device.

2. Shut-off device according to claim 1, further comprising wheels (7a) attached to said hollow cylinder and motor means (7b) for rotating said wheels (7a).

3. Shut-off device according to claim 1 wherein sealing means (12) has a means for pressing against the wall of the pipeline upon a given pressure difference between side (b) on which the pipeline medium enters into the shut-off device and side (a) on which the pipeline medium exits from the shut-off device.

4. Shut-off device according to claim 1, wherein sealing means (12) contains a multilayer gasket which has layers of different hardness.

5. Shut-off device according to claim 1 wherein brake envelope is connected to the hollow cylinder by arms (28).

6. Shut-off device according to claim 5 wherein the arms (28) are at a low angle to the pipe axis at the end facing away from the point where the brake envelope applies pressure to the wall of the pipeline.

7. Shut-off device according to claim 1 further comprising two biased compression springs (23, 24) with respective abutments (25, 26), said springs (23, 24) and abutments (25, 26) disposed on a spindle (21), the valve mounted for longitudinal displacement between spring (24), abutment (26) and spring (23), abutment (25).

8. Shut-off device according to claim 7 further comprising a catch means (27) which holds the valve in the open position against the force of the spring (24).

9. Shut-off device according to claim 1 wherein the hollow cylinder comprises a first hollow cylinder (32) having a first coupling (34) disposed therein; a second hollow cylinder (33) having a second coupling (35) disposed thereon, said first coupler (34) coupling with said second coupler (35) to join said first hollow cylinder (32) and said second hollow cylinder (33); and the radially displaceable sealing means being disposed on the first hollow cylinder (32) and a braking means (36) being disposed on the second hollow cylinder (33).

10. Shut-off device according to claim 1 wherein braking means comprises an annular rubber bag fastened to said hollow cylinder by means of clamp, thereby defining a space between said rubber bag and said hollow cylinder; and a longitudinally slotted metal brake envelope positioned on said rubber bag.

11. Shut-off device according to claim 10 wherein has slotted internal flanges; and the hollow cylinder has an annular groove, said flanges guided for radial displacement by the annular groove.

12. Shut-off device according to claim 11 wherein the slotted brake envelope has brake slats.

13. Shut-off device according to claim 12 wherein the brake slats are of tangentially overlapping construction.

14. Shut-off device according to claim 13 wherein return elements are associated with the brake slats.

15. Shut-off device according to claim 10 wherein the rubber bag is of multilayered construction, each layer having a different hardness.

16. Shut-off device according to claim 10 wherein the thickness of the rubber bag is less than 1 cm.

17. Shut-off device according to claim 10 wherein the brake envelope is provided with a covering having a high coefficient of friction.

18. Shut-off device according to claim 10 wherein the brake envelope has grooves leading from side (b) to side (a).

19. Shut-off device according to claim 10, wherein the hollow cylinder (8) has openings (8a) which allow the pipeline medium to enter into the space between the rubber bag (9) and the hollow cylinder (8).

20. Shut-off device according to claim 19, further comprising a means for remotely controlled closing and opening of the valve (13) and a means for the automatic closing of the valve (13) when the velocity of flow of the pipeline medium exceeds an operational velocity.

21. Shut-off device according to claim 19, further comprising a means for opening the valve upon the occurrence of an over-pressure against the closing direction.

22. Shut-off device according to claim 10 wherein the rubber bag is reinforced tangentially.

* * * * *